United States Patent [19]

Honda

[11] Patent Number: 4,720,766
[45] Date of Patent: Jan. 19, 1988

[54] CERAMIC CAPACITOR

[75] Inventor: Yukio Honda, Nagaokakyo, Japan

[73] Assignee: Murata Manufacturing Co., Ltd., Japan

[21] Appl. No.: 13,669

[22] Filed: Feb. 12, 1987

[30] Foreign Application Priority Data

Feb. 20, 1986 [JP] Japan .................. 61-36185

[51] Int. Cl.⁴ .................. H01G 1/11; H01G 4/06; H01G 4/10
[52] U.S. Cl. .................. 361/275; 361/306; 361/321
[58] Field of Search .............. 361/320, 321, 322, 271, 361/272, 275, 306; 29/25.42

[56] References Cited

U.S. PATENT DOCUMENTS

| | | | |
|---|---|---|---|
| 2,528,113 | 10/1950 | Carlson et al. | 361/275 X |
| 2,582,931 | 1/1952 | Kodama | 361/306 |
| 2,606,955 | 8/1952 | Herrick | 361/321 X |
| 3,002,137 | 9/1961 | Kahn et al. | 361/321 |
| 3,398,338 | 8/1968 | Dornfeld | 361/306 X |
| 3,581,167 | 5/1971 | Veater et al. | 361/321 |
| 4,038,587 | 7/1977 | Kaliebe | 361/321 |

Primary Examiner—Donald A. Griffin
Attorney, Agent, or Firm—Ostrolenk, Faber, Gerb & Soffen

[57] ABSTRACT

A ceramic capacitor comprising a dielectric ceramic plate and electrodes formed on both major surfaces thereof. At least one of the electrodes has an island electrode part and a peripheral electrode part formed to encircle the island electrode part through a gap region, and a resistor is formed to connect the island electrode part with the peripheral electrode part. A terminal is connected to the island electrode part in a region provided with no resistor thereon.

8 Claims, 7 Drawing Figures

CERAMIC CAPACITOR

BACKGROUND OF THE INVENTION

1. Field of the Invention

The present invention relates to a ceramic capacitor which comprises a plate type ceramic member, electrodes formed on both major surfaces thereof and a resistor connected in series with the plate type ceramic member.

1. Description of the Prior Art

A capacitor for preventing oscillation of a power IC employed for, e.g., a radio receiver or a stereo receiver for an automobile is required to have relatively high equivalent series resistance of 1 to several Ω, for example. However, equivalent series resistance of a ceramic capacitor itself is not sufficiently high. Thus, employed is structure for connecting a resistor in series with a ceramic capacitor.

As shown in FIG. 6, such a conventional ceramic capacitor 2 comprises a plate type dielectric ceramic member 4 and electrodes 6a and 6b formed on both major surfaces thereof. A resistor 8 is formed on one electrodes 6a by printing resistance paste, for example. Further, a connection electrode 10 for soldering is formed on the resistor 8, so that a terminal 14a is soldered and fixed to the connection electrode 10 through solder 12. On the other major surface of the ceramic member 4, a terminal 14b is connected to the electrode 6b similarly through solder. Coating resin 16 is applied to the ceramic capacitor 2 through dipping or the like, except for portions for extracting the terminals 14a and 14b.

As obvious from a equivalent circuit as shown in FIG. 7, relatively large equivalent series resistance R is formed in series with electrostatic capacitance C in the aforementioned ceramic capacitor 2.

However, the aforementioned conventional ceramic capacitor 2 has the following disadvantages:

(a) The equivalent series resistance R is formed in the direction of thickness of the resistor 8, whereby the thickness of the resistor is liable to vary and hence the resistance value is varied. However, it is difficult to correct the resistance value through trimming or the like since the electrode 6a is formed under the resistor 8.

(b) Since the terminal 14a cannot be directly soldered to the resistor 8, the connection electrode 10 must be provided for soldering the terminal 14a. Thus, the cost is increased by formation of the connection electrode 10. Further, the connection electrode 10 is inferior in adhesion to the resistor 8, whereby the same may be separated in the working process.

SUMMARY OF THE INVENTION

An object of the present invention is to provide a ceramic capacitor which can increase equivalent series resistance and readily correct the resistance value through simple manufacturing steps at a low cost.

A ceramic capacitor according to the present invention comprises a plate type dielectric ceramic member and electrodes formed on both major surfaces of the dielectric ceramic member. An electrode formed on at least one major surface of the dielectric ceramic member has an island electrode part formed on the one major surface and a peripheral electrode part formed to encircle the island electrode part through a gap region. A resistor is provided to reach the island electrode part and the peripheral electrode part to connect the same with each other. A terminal is electrically connected to a region of the island electrode part provided with no resistor thereon.

In the ceramic capacitor according to the present invention, electrostatic capacitance is mainly formed between the peripheral electrode part formed on at least one major surface of the dielectric ceramic member, the dielectric ceramic member and the electrode formed on the other major surface. Further, series resistance is formed by the resistor between the peripheral electrode part and the island electrode part. Thus, a ceramic capacitor having high equivalent series resistance can be obtained. The equivalent series resistance value is not only adjustable through specific resistance or thickness of the resistor, but can be readily corrected by trimming the resistor on the aforementioned gap region. In addition, the island electrode part can be formed through the same step with the peripheral electrode part, whereby no formation of a connection electrode is required to connect a terminal through a separate step as in the conventional case.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
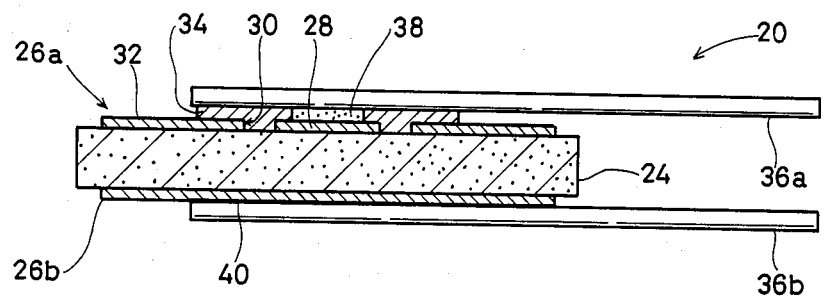
FIG. 1 is a sectional view showing a ceramic capacitor according to an embodiment of the present invention.
Figure 2:
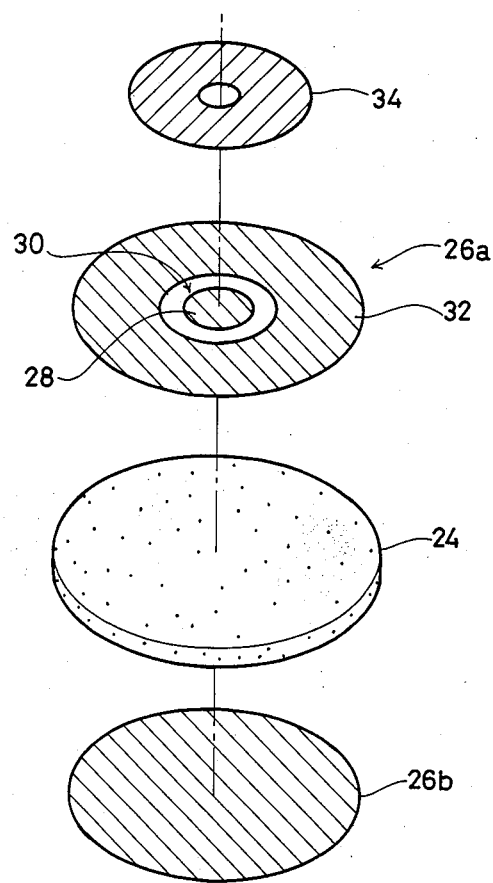
FIG. 2 is an exploded perspective view typically showing the ceramic capacitor of FIG. 1.

FIG. 1 is a sectional view showing a ceramic capacitor according to an embodiment of the present invention, and FIG. 2 is an exploded perspective view typically showing the ceramic capacitor of FIG. 1.

A ceramic capacitor 20 comprises a plate type dielectric ceramic member 24 and electrodes 26a and 26b of, e.g., silver, nickel or copper provided on both major surfaces thereof. The electrode 26a has an island electrode part 28 of, e.g., a circular configuration formed at the center of one major surface of the plate type ceramic member 24 and a closed ring-shaped peripheral electrode part 32 formed to encircle the island electrode part 28 through a gap region 30. The island electrode part 28 may be about 2 to 3 mm in diameter and the gap region 30 may be about 0.1 to 1 mm in width.

A closed ring-shaped resistor 34 is provided substantially over the peripheral edge portion of the island electrode part 28 excepting the central portion and the middle portion in the radial direction of the peripheral electrode part 32, to connect the island electrode part 28 with the peripheral electrode part 32. The resistor 34 can be formed by, e.g., a carbon resistor.

As obvious from FIGS. 1 and 2, the central portion of the island electrode part 28 is exposed since the resistor 34 is not provided on the same. In such an exposed region, a terminal 36a is soldered to the island electrode part 28 through solder 38, for example.

The aforementioned island electrode part 28, the peripheral electrode part 32 and the resistor 34 etc. can be readily formed in desired configurations and sizes through, e.g., pattern printing.

In case of the embodiment shown in FIG. 1, the resistor 34 is smaller than the peripheral electrode part 32. Hence, there is a fear that leak-discharge occurs between the terminal 36a and the peripheral electrode part 32, since a space is formed therebetween. Therefore, the resistor 34 may be so formed to cover the entire surface of the peripheral electrode part 32 in order to prevent such leak-discharge.

On the other hand, the electrode 26b formed on the other major surface of the ceramic member 24 is sized to be opposite to the peripheral electrode part 32 through the ceramic member 24: This electrode 26b is provided with no island electrode part. A terminal 36b is soldered to the electrode 26b through solder 40.

Figure 3:
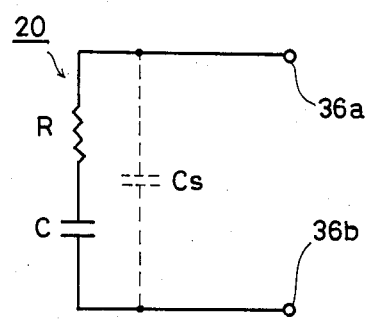
FIG. 3 is an equivalent circuit diagram of the ceramic capacitor according to the embodiment as shown in FIG. 1.

Thus, in the ceramic capacitor 20, electrostatic capacitance C is mainly formed between the peripheral electrode part 32, the ceramic member 24 and the electrode 26b, as obvious from an equivalent circuit shown in FIG. 3. Further, series resistance is formed by the resistor 34 between the peripheral electrode part 32 and the island electrode part 28. Thus, it is understood that equivalent series resistance R of the ceramic capacitor 20 is relatively high.

Figure 6:
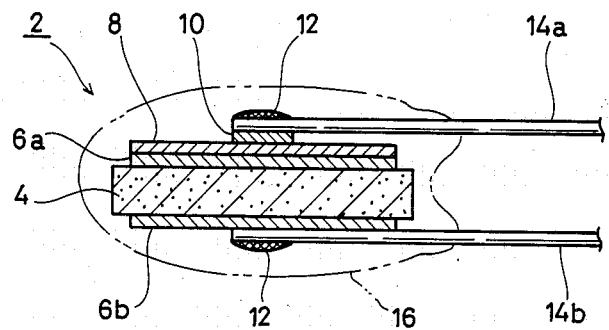
FIG. 6 is a sectional view showing an example of a conventional ceramic capacitor.
Figure 7:
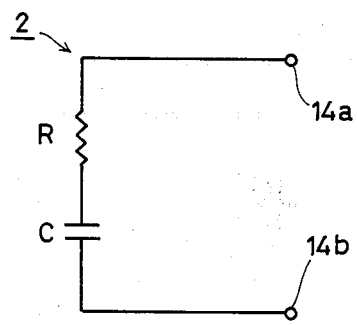
FIG. 7 is an equivalent circuit diagram of the ceramic capacitor as shown in FIG. 6.

There is no need to provide the conventional connection electrode 10 (see FIG. 6) for connecting the terminal through a separate step on the major surface connected with the resistor 34. In other words, the island electrode part 28 to be connected with the terminal 36a can be formed through the same step with the peripheral electrode part 32 for forming capacitance, thereby to simplify the manufacturing steps and to reduce the cost. Further, the terminal 36a can be directly soldered to the island electrode part 28, whereby no problem of separation of the conventional connection electrode 10 is caused and the terminal 36a can be improved in bond strength.

The value of the aforementioned equivalent series resistance R can be arbitrarily adjusted by selecting specific resistance of the material forming the resistor 34 and thickness thereof. Further, the resistance value can be corrected after formation of the resistor 34 by trimming the resistor 34 on the gap region 30.

Figure 4:
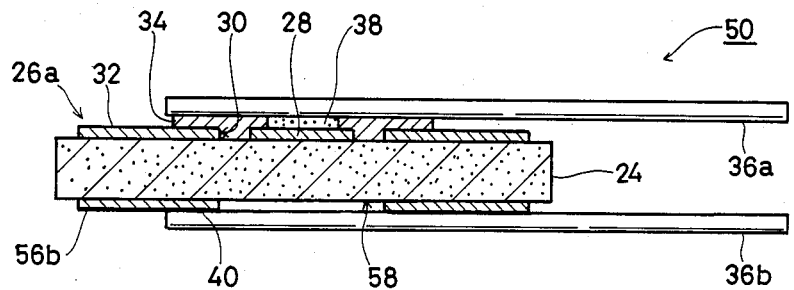
FIG. 4 is a sectional view showing a ceramic capacitor according to another embodiment of the present invention.

FIG. 4 shows a ceramic capacitor according to another embodiment of the present invention. In a ceramic capacitor 50 of this embodiment, an electrode 56b provided on the other major surface of a ceramic member 24 is different in configuration from the electrode 26b of FIG. 1. Other structure of this embodiment is similar to that shown in FIG. 1, and hence corresponding reference numerals are assigned to similar components, to omit redundant description. The electrode 56b is formed not to reach a region opposite to an island electrode part 28 formed on one major surface of the ceramic member 24 through the ceramic member 24. Namely, a circular space 58 is defined in a position opposite to the island electrode part 28. Consequently, relatively small capacitance $C_S$ (see FIG. 3) formed between the island electrode part 28 and the electrode 26b in the embodiment of FIG. 1 can be extremely reduced.

Figure 5:
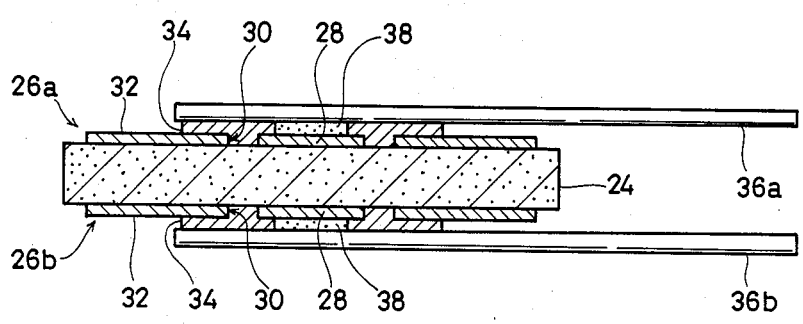
FIG. 5 is a sectional view showing a ceramic capacitor according to still another embodiment of the present invention.

FIG. 5 shows still another embodiment of the present invention. In this embodiment, both of electrodes 26a and 26b formed on major surfaces of a plate type dielectric ceramic member 24 are provided with island electrode parts 28 and peripheral electrode parts 32. Thus, resistors 34 are connected in series with the both major surfaces of the ceramic member 24, whereby equivalent series resistance can be further increased.

Further, since the electrode structure on both major surfaces of the ceramic member 24 are identical to each other, a resistor can be formed on either surface regardless of directivity. In addition, the capacitor thus obtained can be used regardless of directivity since the major surfaces thereof are equivalent in structure.

In order to perform only a step of forming electrodes equally on both major surfaces of the ceramic member, no formation of a resistor is required on one of the major surfaces.

Although the island electrode parts 28 are formed in the central portions of the major surfaces of the ceramic member 24 in the embodiments as hereinabove described with reference to FIGS. 1 to 5, the same may be formed in a position deviating from the center of the major surface, while the configuration thereof is not restricted to the circular form but may be changed to square form or the like. Similarly, the peripheral electrode part 32 may not necessarily be provided in the closed ring form, but may be in a partially cut open ring configuration.

Description is now made on an experiment performed through the ceramic capacitor according to the embodiment of FIG. 1.

A ceramic member 24 was prepared by a disc-shaped element of 8.4 mm in diameter and 0.3 mm in thickness, which was provided with silver electrodes of 7.7 mm in diameter on both major surfaces thereof to have capacitance of 100 nF and dielectric loss of 0.4% (at 1 KHz).

One silver electrode 26a was provided with a peripheral electrode part 32 of 7.7 mm in outer diameter and 3 mm in inner diameter, a gap region 30 of 0.5 mm in width and an island electrode part 28 of 2 mm in diameter. The island electrode part 28 and the peripheral electrode part 32 were formed by pattern printing of silver paste.

An annular resistor 34 of 4.5 mm in outer diameter and 1.5 mm in inner diameter was formed on the electrode 26a by pattern printing of carbon paste.

Another electrode 26b was formed by printing silver paste in the form of a disc of 7.7 mm in diameter.

One terminal 36a was soldered to a part of the island electrode part 28 and another terminal 36b was soldered to the electrode 26b respectively.

The following Table shows characteristics of the aforementioned example as well as those of a ceramic capacitor prepared as reference example. In the ceramic capacitor of the reference example, an electrode identical to the electrode 26b of the present invention was formed in place of the island electrode part 28 and the peripheral electrode part 32, such that a terminal was directly connected to the said electrode while no resistor was provided.

TABLE

| | Initial Value (at 1 KHz) | | Equivalent Series Resistance (Ω, at 1 MHz) |
|---|---|---|---|
| | Capacitance (nF) | Dielectric Loss (%) | |
| Example | 93.8 | 0.65 | 1.65 |
| Reference Example | 108.5 | 0.41 | 0.10 |

It is understood from the above Table that equivalent series resistance of the ceramic capacitor according to the present invention is extremely high as compared with the reference example. Although the initial capacitance of the inventive ceramic capacitor is lower by about 10% than that of the reference example, such difference is believed to be negligible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ceramic capacitor comprising:
   a plate type dielectric ceramic member;
   electrodes formed on both major surfaces of said dielectric ceramic member, one said electrode formed on at least one said major surface of said dielectric ceramic member having an island electrode part formed on said major surface of said dielectric ceramic member and a peripheral electrode part formed to encircle said island electrode part through a gap region;
   a resistor formed to reach said island electrode part and said peripheral electrode part to connect the same with each other; and
   a terminal electrically connected to said island electrode part in a region provided with no resistor thereon.

2. A ceramic capacitor in accordance with claim 1, wherein said peripheral electrode part is provided in the form of a closed ring.

3. A ceramic capacitor in accordance with claim 1, wherein said resistor is formed to entirely cover said gap region between said island electrode part and said peripheral electrode part.

4. A ceramic capacitor in accordance with claim 1, wherein said resistor is formed to cover the entire outer surface of said peripheral electrode part.

5. A ceramic capacitor in accordance with claim 1, wherein said island electrode parts and said peripheral electrode parts are formed on both said major surfaces of said ceramic member.

6. A ceramic capacitor in accordance with claim 5, wherein resistors are formed to connect said island electrode parts with said peripheral electrode parts on both said major surfaces of said ceramic member.

7. A ceramic capacitor in accordance with claim 1, wherein said electrode formed on said one major surface of said ceramic member has said island electrode part and said peripheral electrode part and said electrode formed on the other said major surface is formed to be in an outer configuration opposite to said peripheral electrode part through said ceramic member.

8. A ceramic capacitor in accordance with claim 7, wherein said electrode formed on said other major surface of said ceramic member is formed in a portion other than a region opposite to said island electrode part formed on said one major surface of said ceramic member through said ceramic member.

* * * * *